May 13, 1947.  A. K. ESPENAS  2,420,364
TELESCOPING TURNBUCKLE
Filed Feb. 19, 1946
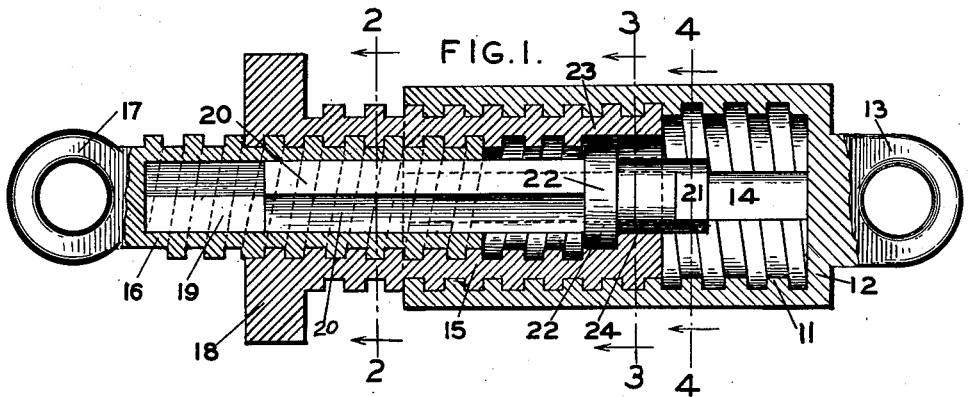
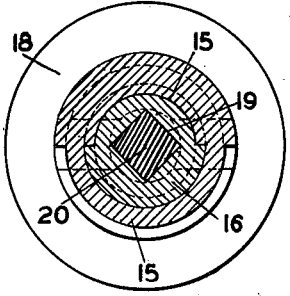
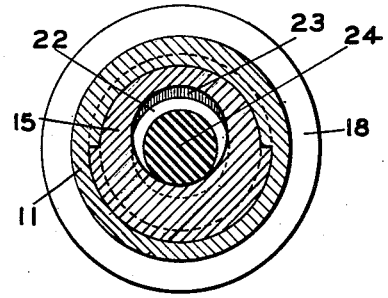
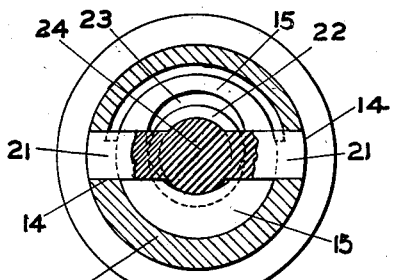
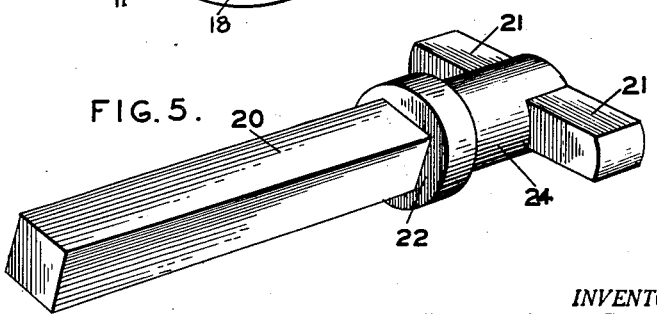
*INVENTOR.*
ARTHUR K. ESPENAS
BY
ATTORNEYS Patented May 13, 1947

2,420,364

UNITED STATES PATENT OFFICE 2,420,364

TELESCOPING TURNBUCKLE

Arthur K. Espenas, Denton, Tex.

Application February 19, 1946, Serial No. 648,630

5 Claims. (Cl. 287—60)

This invention relates to turnbuckles, and more particularly to a turnbuckle wherein the link elements thereof are keyed to prevent rotation relative to each other.

A main object of the invention is to provide a novel and improved turnbuckle device of very simple construction which is easy to adjust, which is very stable in adjustment, not subject to bending or buckling under compressive loads, and which is relatively compact for a given range of longitudinal extension.

A further object of the invention is to provide an improved turnbuckle device which is very efficient in operation, rugged in construction and not susceptible to accidental changes in adjustment.

Further objects and advantages of the invention will become apparent from the following description and claims, and from the accompanying drawings, wherein:

Figure 1 is a longitudinal cross-sectional view of a turnbuckle device constructed in accordance with the present invention.

Figure 2 is a transverse cross-sectional view taken on line 2—2 of Figure 1.

Figure 3 is a transverse cross-sectional view taken on line 3—3 of Figure 1.

Figure 4 is a transverse cross-sectional view taken on line 4—4 of Figure 1.

Figure 5 is a perspective detail view of a key member employed in the turnbuckle device of Figure 1.

Referring to the drawings, 11 designates an outer housing which is generally cylindrical in shape and is closed at one end by a wall 12. Integrally formed on wall 12 is an eye 13. Housing 11 is internally threaded and its interior wall is formed with a pair of opposing longitudinal grooves 14, 14. Threadedly engaged in housing 11 is a sleeve member 15 whose exterior surface is threaded to correspond with the internal threads in housing 11 but whose interior surface is threaded in an opposite sense. Engaged with said interior surface is a link member 16 threaded to correspond with said interior surface and formed at its end with an eye 17. Sleeve member 15 is formed at its externally exposed end with a flange 18, which is shaped so as to permit a torque to be readily applied thereto by hand or by a wrench. The shape of the sleeve flange 18 may be hexagonal, square, knurled, or the like.

Link member 16 is formed with a longitudinal bore 19 which is non-circular in cross-section, such as square, hexagonal, elliptical or the like. Slidably engaged in bore 19 but non-rotative with respect thereto, is a key member 20 having a shank portion conforming in cross-sectional shape to said bore. The end portion of key member 20 is formed with a pair of transversely extending lugs 21, 21 which are slidably engaged in the respective longitudinal grooves 14, 14 formed in the interior surface of housing 11. Housing 11 is thereby keyed to link member 16.

Key member 20 is formed adjacent lugs 21, 21 with a circular collar 22 which is received in a shouldered recess 23 provided therefor in the end portion of sleeve 15. Recess 23 is circular at its opening portion but is eccentric to the axis of sleeve 15, at said opening portion. The shank of key member 20 is circular in cross-section at 24 to permit relative rotation between said circular portion 24 and the adjacent wall of recess 23.

In assembling the turnbuckle, key member 20 is placed in sleeve 15, collar 22 passing through the eccentric opening portion of recess 23 and being positioned in the shouldered portion thereof with the axis of the key member aligned with the axis of the sleeve. Housing 11 is then engaged with the externally threaded portion of sleeve 15 with lugs 21, 21 of the key member engaged in grooves 14, 14 of the housing. Link member 16 is then engaged with the internal threads of sleeve 15 with the non-circular shank portion of key member 20 received within the bore 19 of said link member. This keys link member 16 to housing 11. Link member 16 may then be retracted with respect to housing 11 by rotating flanged sleeve 15 with respect to the keyed parts 11 and 16.

When the turnbuckle is assembled, rotation of flange 18 in one direction will extend the eye portions 13 and 17, whereas rotation of said flange in the opposite direction will move said eye portions toward each other, said eye portions being meanwhile keyed together in a non-rotative manner. This eliminates the inconvenience of having to adjust the link elements individually when the turnbuckle is being adjusted. Also eliminated are accidental changes in adjustment due to torque applied to the links, as in the case where a cable or rope including the turnbuckle is twisted or where tension is applied to a cable or rope of twisted and stranded construction including the turnbuckle.

A torque applied to one link element is transmitted directly to the other link element, thus enabling the turnbuckle to be used as a connection in a drive shaft or similar shaft.

It is to be noted that the turnbuckle structure above described is unusually compact since a minimum overall length is required for a given range of extension. Furthermore, the ratio of diameter to length is large, providing increased rigidity and compressional strength, thus adapting the device for use as an adjustable compression member as well as a tension member.

While a specific embodiment of a turnbuckle structure has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A turnbuckle comprising a first link element in the form of an internally threaded housing, a longitudinal groove in the interior wall of said housing, a sleeve member having external threads engaged with the internal threads of said housing, said sleeve member having internal threads opposite in sense to said external threads, a second link element threadedly engaged with the internal threads of said sleeve member, said second link element having a non-circular longitudinal bore, and a key member having a first portion slidably and non-rotatively fitting said bore and a second portion slidably and non-rotatively engaged with the longitudinal groove in the interior wall of the housing.

2. The structure of claim 1, and wherein said sleeve member is formed with an arcuate recess and wherein said key member carries a laterally directed projection received within said recess, whereby said key member is longitudinally restrained with respect to said sleeve member.

3. The structure of claim 1, and wherein said sleeve member is formed with an external flange.

4. A turnbuckle comprising a first link element in the form of an internally threaded housing having a closed end, a plurality of longitudinal grooves in the interior wall of said housing, a flanged sleeve member having external threads engaged with the internal threads of said housing, said sleeve member having internal threads opposite in sense to said external threads, a second link element threadedly engaged with the internal threads of said sleeve member, said second link element having a non-circular longitudinal bore, and a key member having a first shank portion slidably and non-rotatably fitting said bore and a second shank portion slidably and non-rotatively engaged in the longitudinal grooves in the interior wall of the housing, said sleeve member being formed with an arcuate recess in its inner wall surface and said key member having a collar rotatably received in said arcuate recess whereby said key member is longitudinally restrained with respect to said sleeve member.

5. The structure of claim 4 and wherein said sleeve member is formed with an eccentrically located bore at its end portion communicating with said arcuate recess.

ARTHUR K. ESPENAS.